May 28, 1968      A. B. EUGA      3,385,173

AIR BRAKE CYLINDER CONSTRUCTION

Original Filed April 29, 1963      5 Sheets-Sheet 1

INVENTOR.
ARTHUR B. EUGA

INVENTOR.
ARTHUR B. EUGA

May 28, 1968 A. B. EUGA 3,385,173
AIR BRAKE CYLINDER CONSTRUCTION
Original Filed April 29, 1963 5 Sheets-Sheet 4

INVENTOR.
ARTHUR B. EUGA

May 28, 1968 A. B. EUGA 3,385,173
AIR BRAKE CYLINDER CONSTRUCTION
Original Filed April 29, 1963 5 Sheets-Sheet 5
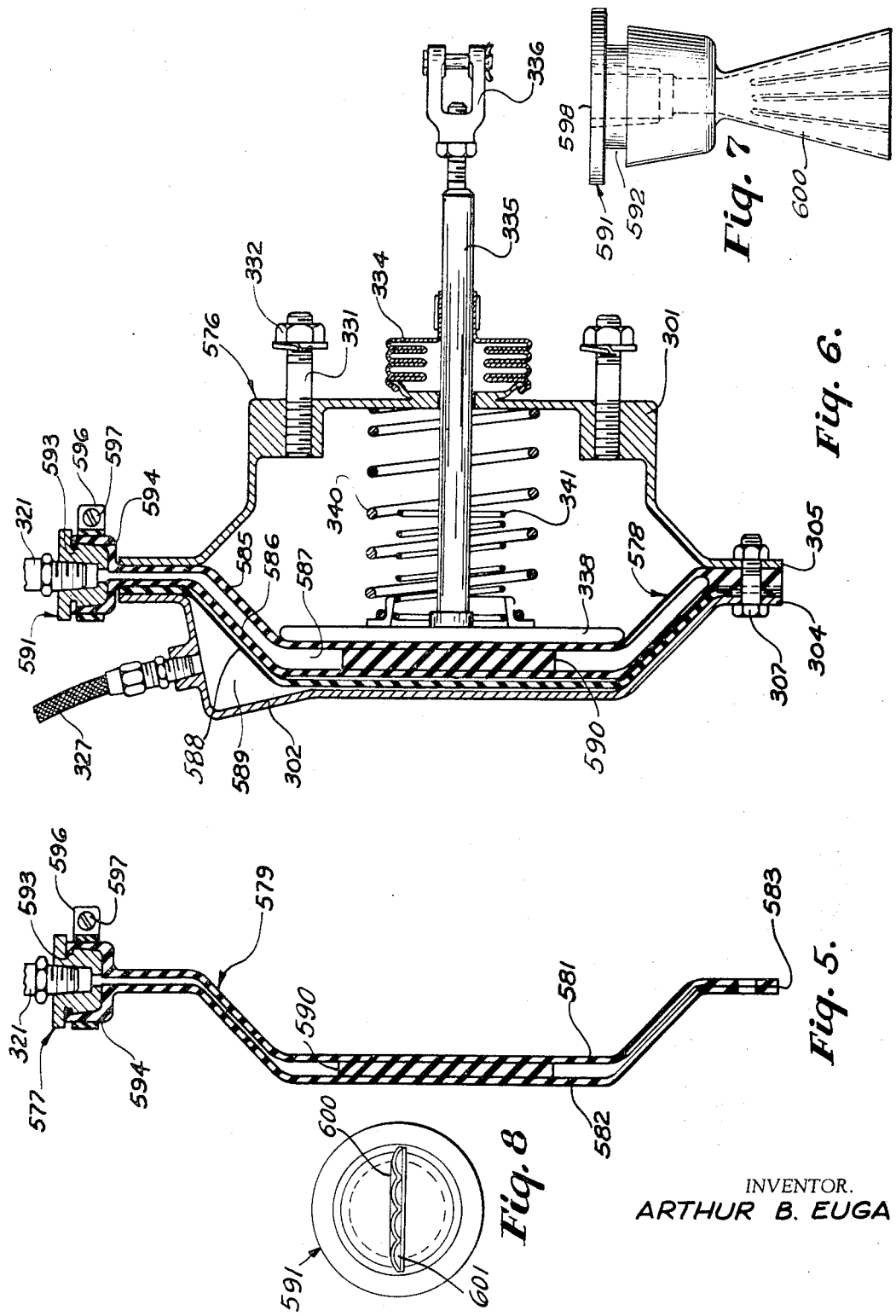
INVENTOR.
ARTHUR B. EUGA United States Patent Office 3,385,173
Patented May 28, 1968

3,385,173
AIR BRAKE CYLINDER CONSTRUCTION
Arthur B. Euga, 728½ Franklin Ave.,
Columbus, Ohio 43205
Original application Apr. 29, 1963, Ser. No. 282,525.
Divided and this application Jan. 25, 1966, Ser. No. 539,600
5 Claims. (Cl. 92—62)

ABSTRACT OF THE DISCLOSURE

A dual chamber air brake cylinder is provided for use in braking systems for vehicles wherein both a main fluid pressure system and an auxiliary fluid pressure system are provided for supplying pressure to the brake mechanisms. The disclosure particularly relates to brake systems where the auxiliary fluid pressure system automatically supplies pressure to the brake cylinders upon failure of the main fluid pressure system of the vehicle. The cylinders disclosed utilize two flexible diaphragms both of which are operable to force the brake actuating rod towards its brake applying position.

This is a division of application Ser. No. 282,525, filed Apr. 29, 1963, now abandoned.

This application relates generally to braking systems for vehicles of the type wherein auxiliary braking means are provided for actuating the brake mechanisms upon failure of the service braking system of the vehicle.

Application Ser. No. 282,525 is a continuation of my co-pending application Ser. No. 788,480, filed Jan. 6, 1959, now abandoned which is a division of my co-pending application Ser. No. 564,315, filed Feb. 8, 1956, now Patent No. 2,871,827, which is a continuation-in-part of my co-pending application Ser. No. 176,785, filed July 31, 1950, now abandoned, and relates to certain modifications and improvements of the systems disclosed therein.

One object of the invention is the provision of a novel means adaptable for instantly supplementing the fluid action of the service braking means upon partial loss of the serving fluid therefor.

It is another object of the present invention to provide a novel air brake cylinder of improved construction which incorporates flexible diaphragm means separating a service brake chamber from an auxiliary chamber which air brake cylinder incorporates novel safety means for preventing failure of said flexible diaphragm means separating said chambers.

It is another object of the present invention to provide various novel air brake cylinders of improved construction.

It is another object of the present invention to provide various air brake cylinder constructions of the multiple chamber type which constructions include improved means for securing a multiplicity of flexible diaphragms in an air brake cylinder.

It is another object of the present invention to provide a novel air brake cylinder construction which includes a plurality of flexible wall means, forming a multiplicity of chambers, which plurality of flexible wall means are integrally formed in sealed relationship.

Further objects and advantages of the present invention will be apparent from the following description, reference being had to the accompanying drawings wherein preferred forms of embodiments of the invention are clearly shown.

In the drawings:

FIGURES 5 through 8 illustrate still another novel brake cylinder constructed according to the present invention. The section of FIGURE 5 is taken along a vertical plane passing through the longitudinal center line of the cylinder.

Figure 1:
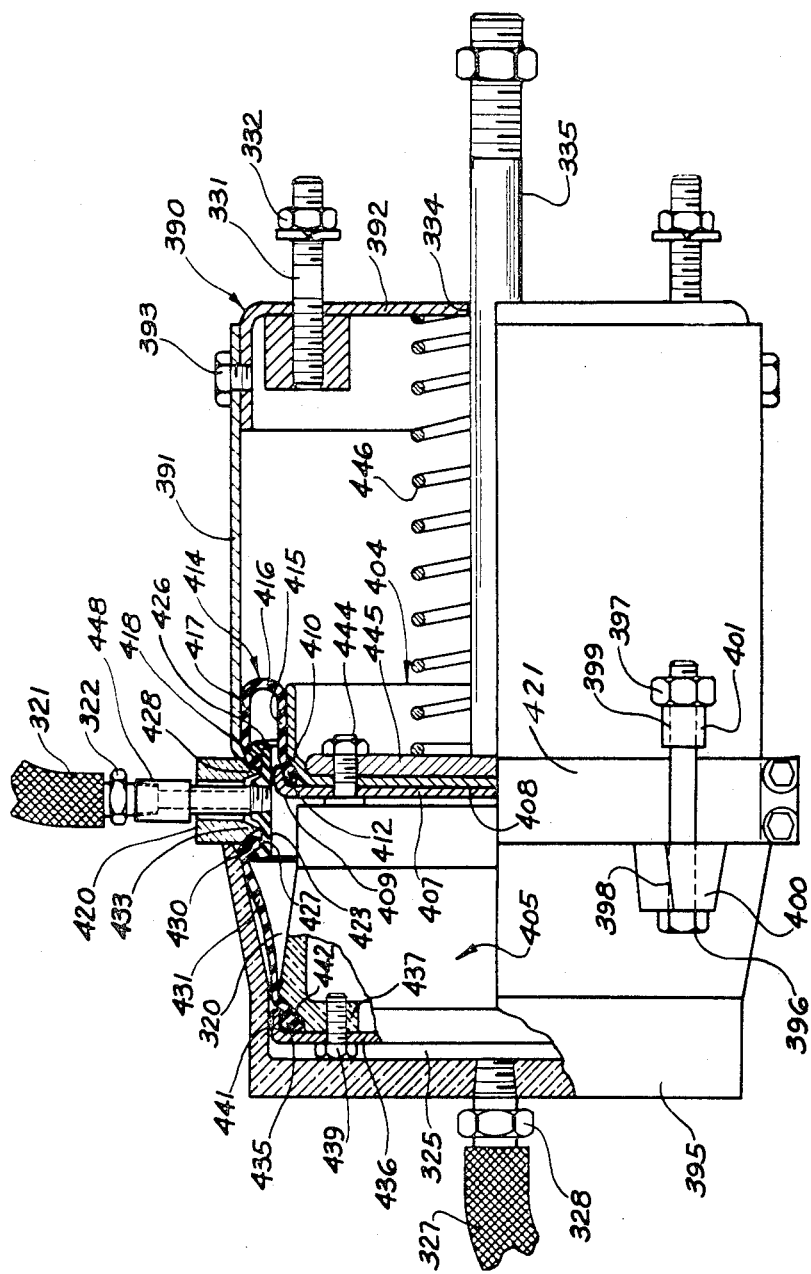
FIGURE 1 is an elevational view of a novel air brake cylinder embodying the invention with parts broken away and shown in section in a plane passing through the longitudinal center line of the cylinder.

FIGURE 1 shows a brake cylinder construction indicated generally at 390. This construction includes a forward annular casing portion 391 secured to a second forward casing portion 392 by a plurality of cap screws 393. A rear casing portion 395 is secured to forward casing portion 391 by bolts 396 and nuts 397 with bolts 396 being extended through holes 398 and 299 in flanges 400 and 401, respectively. The cylinder 390 includes a forward movable wall, indicated generally at 404, and a rear moveable wall, indicated generally at 405, which movable walls form confines of a sealed chamber 320. A second sealed chamber 325 is formed between movable wall 405 and the inner surface of rear casing portion 395.

Referring particularly to the forward movable wall 404, such construction includes a pair of members 407 and 408 provided with flanged peripheral portions 409 and 410 which serve to clamp against and retain a bead 412 of a flexible wall portion indicated generally at 414. It will be noted that flexible wall portion 414 includes a forwardly extending portion 415, and outwardly extending portion 416, and a rearwardly extending portion 417 provided with a peripheral edge portion which may include a bead 418. A pair of clamping elements 420 and 421 surround an annular member 423 which member includes circumferentially extending grooves 426 and 427. A circumferentially extending protrusion 428 is carried on the inner surfaces of clamping members 420 and 421 with the bead 418 of flexible wall portion 414 being clamped between protrusion 428 and the surface of groove 426. In a like manner, a second flexible wall portion 431 is clamped between a protrusion on the inner surface of clamping members 420 and 421, and the inner surface of circumferentially extending groove 427 in annular member 423.

The other edge of the second flexible wall member 431 is provided with a bead 435 which is clamped between members 436 and 437 rear movable wall 445. A plurality of cap screws 439 are provided for drawing member 436 against member 437 whereby bead 435 is clamped between flange portion 441 and surface 442 on members 436 and 437, respectively. A threaded member 444 is used for fastening members 407 and 408 and plate 445 together whereby bead 412 of the first flexible wall portion is clamped between the members.

Figure 2:
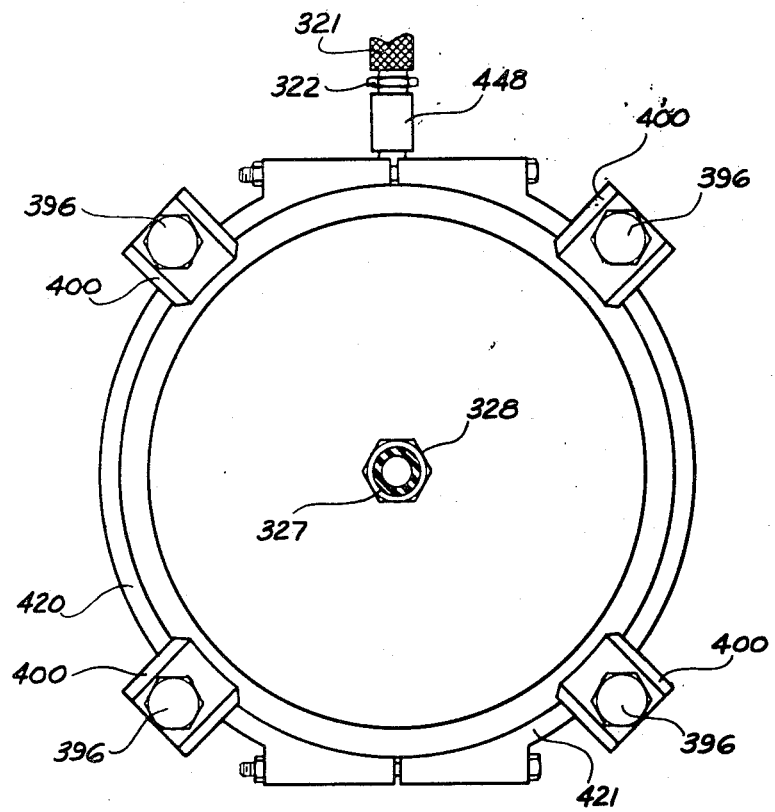
FIGURE 2 is an end elevational view of the brake cylinder of FIGURE 1.

In operation of the cyinder of FIGURES 1 and 2 when pressurized, fluid is introduced through line 321, as from the service brake circuit of the braking system, the forward movable wall 404 is extended away from the rear wall portion 405 and flexible wall portion 414 will roll forwardly as brake actuating rod 335 is extended through hole 334 against the action of spring 446. When pressurization of chamber 320 ceases, the action of compression spring 446 returns forward movable wall means 404 to the position illustrated.

When the rear chamber 325 is pressurized, such as would occur upon actuation of the auxiliary brake fluid circuit to introduce pressure through line 327, the rear movable wall portion 405 is moved forwardly such that member 437 forces the forward movable wall 404 forwardly whereby brake actuating rod 335 is extended through hole 334.

It will be noted, in FIGURE 1, that air from line 321 passes to chamber 320 through a passage formed axially through a fitting 448 which extends through the clamping members 420 and 421 is retained in threaded engagement in the annular member 423.

Figure 3:
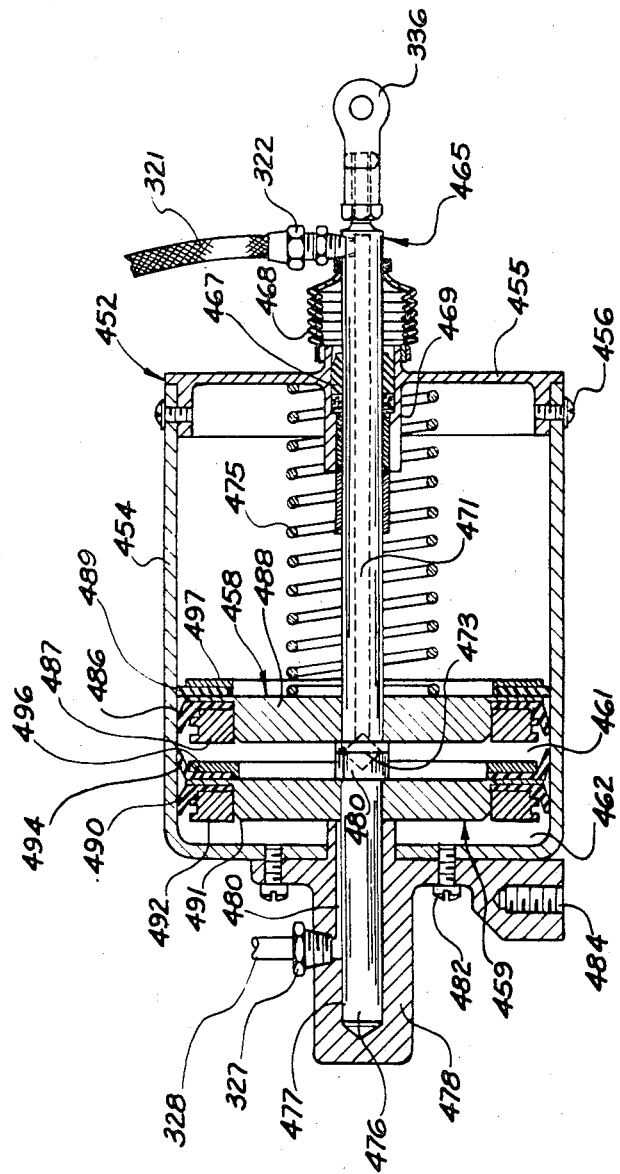
FIGURE 3 is a side sectional view of another novel air brake cylinder comprising another aspect of the present invention. The section is taken along a vertical plane through the longitudinal center line of the cylinder.

Reference is next made to FIGURE 3, which illustrates another brake cylinder construction, indicated generally at 452, with such cylinder construction including a casing portion 454 having a forward wall portion 455 secured thereto by screws 456. The casing contains a forward movable wall, indicated generally at 458. A first sealed chamber 461 is formed between movable walls 458 and 459 and a second sealed chamber 462 is formed between movable wall 459 and the interior of casing portion 454. A brake actuating rod 465 is extended through the front casing portion 454 at a seal 467 and boot 468. A passage 471 extends axially through brake actuating rod 465 and communicates with line 321 at fitting 322. When pressurized air is introduced through line 321 and passage 471, it will enter chamber 461 at the opening 473 in the inner end of brake actuating rod 465. This action causes brake actuating rod 465 to extend to actuate the conventional braking mechanism at the wheel of the vehicle. When the pressure in chamber 461 is relieved, a spring 475 serves to return forward movable wall 458 to the position illustrated.

Referring next to the rear movable wall 459, such wall is carried on a rod 476 which is slideably carried in a hole 477 formed in a housing member 478. When line 328 is pressurized, such as will occur when the circuit of the auxiliary brake actuating mechanism is energized, pressurized fluid is introduced into chambers 462 through a passage 480 which communicates with line 328 at fitting 327. This action causes rear movable wall means 459 to apply force to forward removable wall means 458 at a spacer portion 481 on the forward end of rod 476. Both removable wall means 458 and 459 move forwardly whereby brake actuating rod 465 is extended. When the pressure in the rear sealed chamber 462 is decreased, the action of spring 475 returns both the wall means 458 and 459 to the position illustrated.

Housing member 478 is secured to casing portion 454 by a plurality of cap screws 482. Casing portion 478, and hence the entire cylinder construction, can be secured to the vehicle by threaded elements screwed into holes 484 of casing portion 478.

As seen in FIGURE 3, the periphery of movable wall 458 is provided with a rearwardly facing flexible seal 486 clamped between an annular member 487 which may be pressed or shrunk onto wall portion 488. Movable wall 458 is further provided with a flexible wiper member 489 for protecting flexible seal member 486. The rear movable wall 459 includes a rearwardly facing flexible seal 490 clamped between a wall portion 491 and annular member 492. The rear movable wall 459 further includes a forwardly facing flexible seal 494 clamped between wall portion 491 and an annular member 496.

Figure 4:
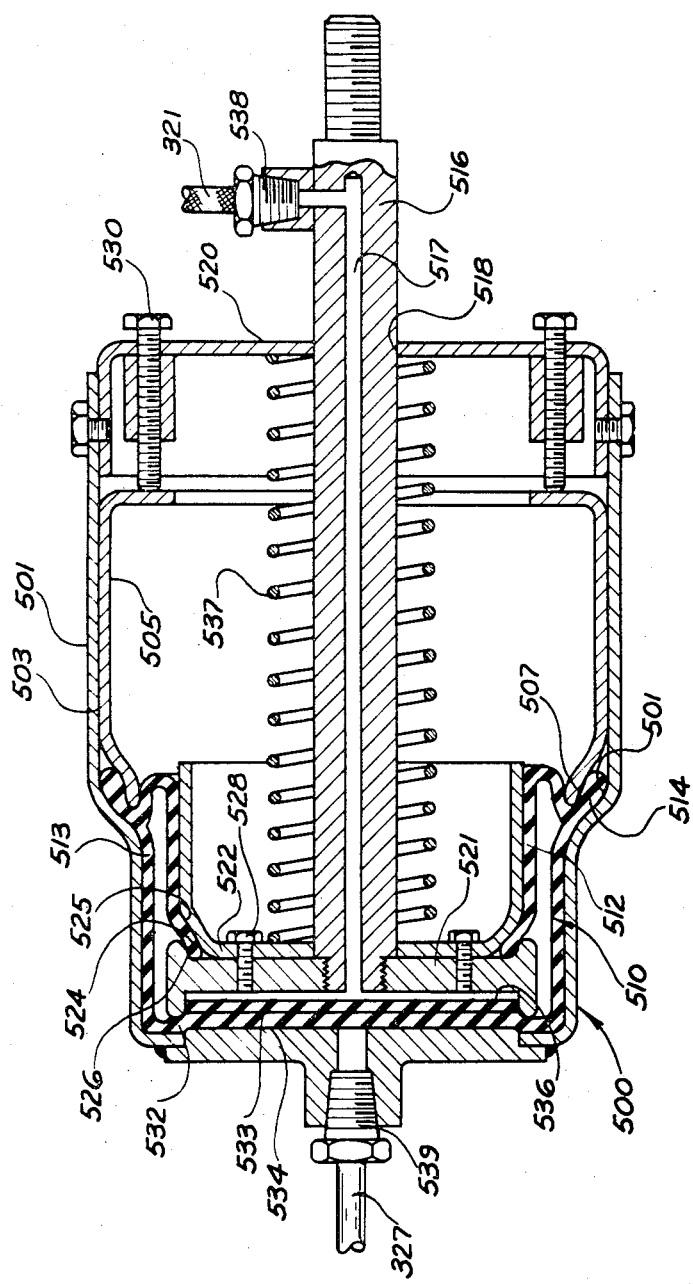
FIGURE 4 is a side sectional view of another novel air brake cylinder comprising another aspect of the present invention. The section is taken along a vertical plane through the longitudinal center line of the cylinder.

FIGURE 4 illustrates another brake cylinder construction indicated generally at 500 and including a casing portion 501 having a shoulder 502 formed on an inner surface 503. A hollow member 505 is insertably carried in casing portion 501 and includes a second shoulder 507. A flexible diaphragm member, indicated generally at 510, includes a forwardly extending portion 512, a rearwardly extending portion 513, and a bead 514 disposed between shoulders 501 and 507.

A brake actuating member 516 including a hollow passage 517 is extended through an opening 518 in a forward closure 510 for the casing portion 501. Actuating member 516 carries two radially extending plate members 521 and 522. A bead 524 is formed on forward portion 512 of flexible diaphragm member 510 and is clamped between confronting shoulders 525 and 526 by means of a plurality of threaded elements 528 adapted to move said shoulders one towards the other.

With continued reference to FIGURE 4, a plurality of threaded elements 530 are movably carried by the casing and in engagement with hollow member 505 for moving shoulder 507 towards shoulder 501 whereby bead 514 is clamped in the position illustrated. The rear portion of flexible diaphragm 510 includes an integrally formed rear wall portion 532 which separates a first sealed chamber 533 from a second sealed chamber 534, the latter being formed by the rear surface of flexible diaphragm 510 and the inner surface of the casing. A reinforcing or spacer member 536 is carried by one of the confronting surfaces of member 522 and diaphragm rear wall 532. A compression spring 537 is positioned between cover member 520 and member 521 for urging the actuating member 516 rearwardly. A fluid intake opening 538, for chamber 533, is connected to one of the previously mentioned lines 321 or 327 and a second fluid intake opening 539 for the other chamber 534, is connected to the other of said lines 321 or 327.

FIGURES 5 through 8 illustrate still another brake cylinder 576 and a modification thereof indicated generally at 577. The modification 576 utilizes a bag-type diaphragm construction, indicated generally at 578, which is of integrally formed one piece moulded construction. The modification of FIGURE 5 illustrates a bag-type diaphragm construction indicated generally at 579. Diaphragm 579 is formed of two flexible sheets 581 and 582 having confronting peripheral surfaces sealed together at a sealed junction 583. The surfaces at 583 may be joined together in any suitable manner such as by cement or vulcanization.

The cylinder 576 includes a forward casing portion 302 provided with peripheral flange portions 304 and 305, respectively, joined together by bolts 307. The forward casing portion 301 may be provided with studs 331 and nuts 332 for securing the cylinder to a vehicle. Extending through the forward casing portion 301 is a brake actuating rod 335 provided with suitable means such as a clevis 336 for operating the brake shoes of the vehicle. A flexible boot 334 may be provided at the junction of the actuating rod 335 and the casing portion 301 to serve as a dirt seal. The inner end of the brake actuating rod 335 carries a plate element 338 which is contacted by a substantial portion of the area of the flexible wall portion 585. Compression springs 340 and 341 are disposed between the plate element 338 and the inner surface of the forward casing portion 301 for urging the plate element 338 to the rearward position shown in FIGURE 6.

As seen in FIGURE 6, bag-type diaphragm 578 includes a front flexible wall portion 585 and a rear flexible wall portion 586 which form the confines of a first sealed chamber 587 located within the sealed chamber 587 is a spacer 590 which separates the flexible wall portions 585 and 586. A third flexible wall member 588 may be utilized, in a manner previously described, to cooperate with flexible wall member 586 in forming the front confines of a second sealed chamber 589.

One of the lines 321 or 327, previously described, is connected to the rear sealed chamber 589 and the other of said lines 321 or 327 communicates with front sealed chamber 587 through a passage forming member illustrated generally at 591. As is best seen in FIGURES 6–8, passage forming member 591 includes a groove 592 arranged to receive a lip 593 at the top of a cup 594 integrally formed in bag-type diaphragms 578 and 579. A hose-type clamp, or band, 596 encircles the outer surface of cup 594 and a bolt 597 provides means for tightening the band about the cup. The passage forming member 591 includes a threaded intake opening 598 for receiving a conventional line fitting and a flat portion 600 of corrugated cross-sectional shape which construction forms a plurality of small passages 601, each of which connects intake opening 598 with the front sealed chamber 587. Since the portion 600 in very thin, it will be understood that such portion will extend through the peripheral portions of bag-type diaphragms 578 and 579 without producing objectional thickness between the confronting flanges 304 and 305. At the same time, the plurality of small passages 601 provide ample port area for the entrance and exit of air to and from front sealed chamber 587.

While the forms of embodiments of the present invention as herein disclosed constitute preferred forms, it is to be understood that other forms might be adopted, all coming within the scope of the claims which follow.

I claim:
1. An improved air cylinder construction for the braking system of a vehicle which construction comprises, in combination, casing means; a flexible member carried in said casing, said member including a forward wall portion, a rear wall portion, and a peripheral portion, said portions forming the confines of bag-type sealed chamber within said flexible member; a movable wall including a forward side in force transmitting relationship with said wall portions and a rear side forming a wall of a second sealed chamber; a brake actuating rod in force receiving engagement with said flexible member and extended to the exterior of said casing; passage means communicating with one of said sealed chambers; and a second passage means communicating with the other of said sealed chambers.

2. Mechanism defined in claim 1 characterized by said peripheral portion of said flexible member including a hollow insert forming at least a portion of one of said passage means.

3. Mechanism defined in claim 1 characterized by the inner surface of one of said wall portions including spacer means engageable with the confronting inner surface of the other of said wall portions.

4. Mechanism defined in claim 1 characterized by said three portions of said flexible member being integrally formed by a moulded one piece construction.

5. Mechanism defined in claim 1 characterized by said peripheral portion of said flexible member being formed by the peripheral edges of said two wall portions being sealed together as an air-tight junction.

References Cited

UNITED STATES PATENTS

| | | | |
|---|---|---|---|
| 1,492,158 | 4/1924 | Caretta | 92—92 |
| 1,776,288 | 9/1930 | Livingston | 92—92 |
| 1,853,473 | 4/1932 | Terwilliger et al. | 285—253 |
| 2,798,745 | 7/1957 | Nelson | 285—137 X |
| 2,936,785 | 5/1960 | Hastings | 92—63 X |
| 3,064,685 | 11/1962 | Washnock et al. | 92—63 X |
| 3,084,961 | 4/1963 | Merriman | 92—92 X |

FOREIGN PATENTS

| | | |
|---|---|---|
| 584,025 | 9/1933 | Germany. |
| 810,901 | 3/1959 | Great Britain. |

MARTIN P. SCHWADRON, *Primary Examiner*

I. C. COHEN, *Assistant Examiner*.